Sept. 10, 1940.  W. O'B. LA FAVE  2,214,533
SUCTION BLOWER HEADER FOR COMBINED REAPER THRESHERS
Original Filed June 17, 1938  2 Sheets-Sheet 1

William O'Berg La Fave
INVENTOR
BY Victor J. Evans & Co.
ATTORNEY

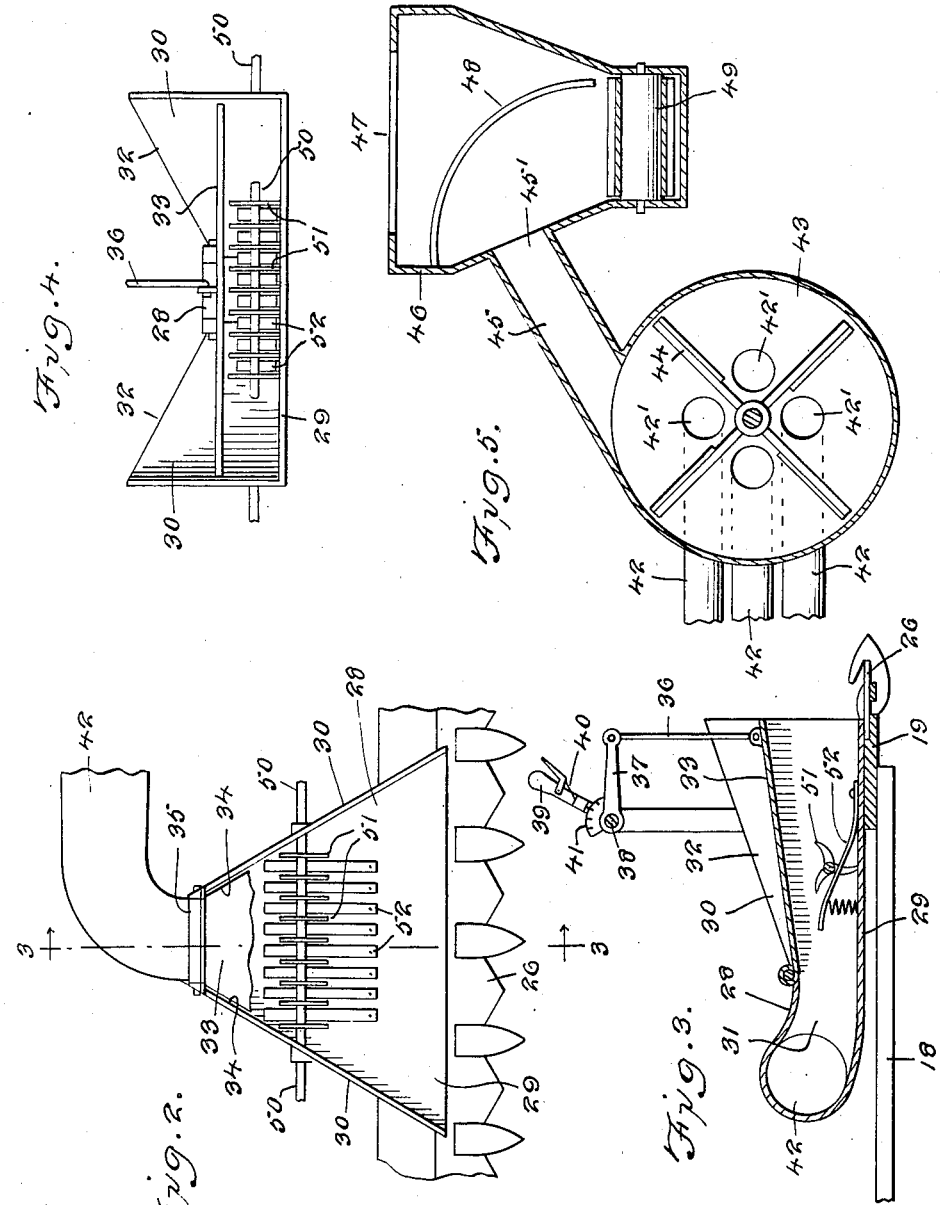

Patented Sept. 10, 1940

2,214,533

UNITED STATES PATENT OFFICE 2,214,533

SUCTION BLOWER HEADER FOR COMBINED REAPER THRESHERS

William O'Berg La Fave, Glasgow, Mont., assignor of one-fourth to Stanley Kalinski, Glasgow, Mont.

Application June 17, 1938, Serial No. 214,329
Renewed March 21, 1940

7 Claims. (Cl. 56—219)

This invention relates to combined harvesters and threshers and more particularly to a suction and blower header mechanism for such machines.

The invention has for its principal object to minimize grain loss and secure a greater and more complete gathering of the standing stalks without shattering effect.

Another object is to produce a practical and effective pneumatic header mechanism which may be incorporated in correlation to the threshing mechanism without material alteration in either.

With these and other objects to be attained, as will hereinafter more fully appear, the invention consists in the general structure and in the parts and combinations and arrangements of parts thereof, as set forth in the following description and pointed out with particularity in the appended claims, reference being had to the accompanying drawings forming a part of this specification, and in which Figure 1 is a top plan view of the header and adjacent portions of the threshing mechanism of the machine;

Figure 2 is a fragmentary view, in top plan of one of the intake nozzle elements with the adjustable cover thereof removed;

Figure 3 is a vertical section taken substantially on the line 3—3 of Figures 1 and 2;

Figure 4 is a front elevation of the intake nozzle; and

Figure 5 is a section taken on or about the line 5—5 of Figure 1.

Figure 1:
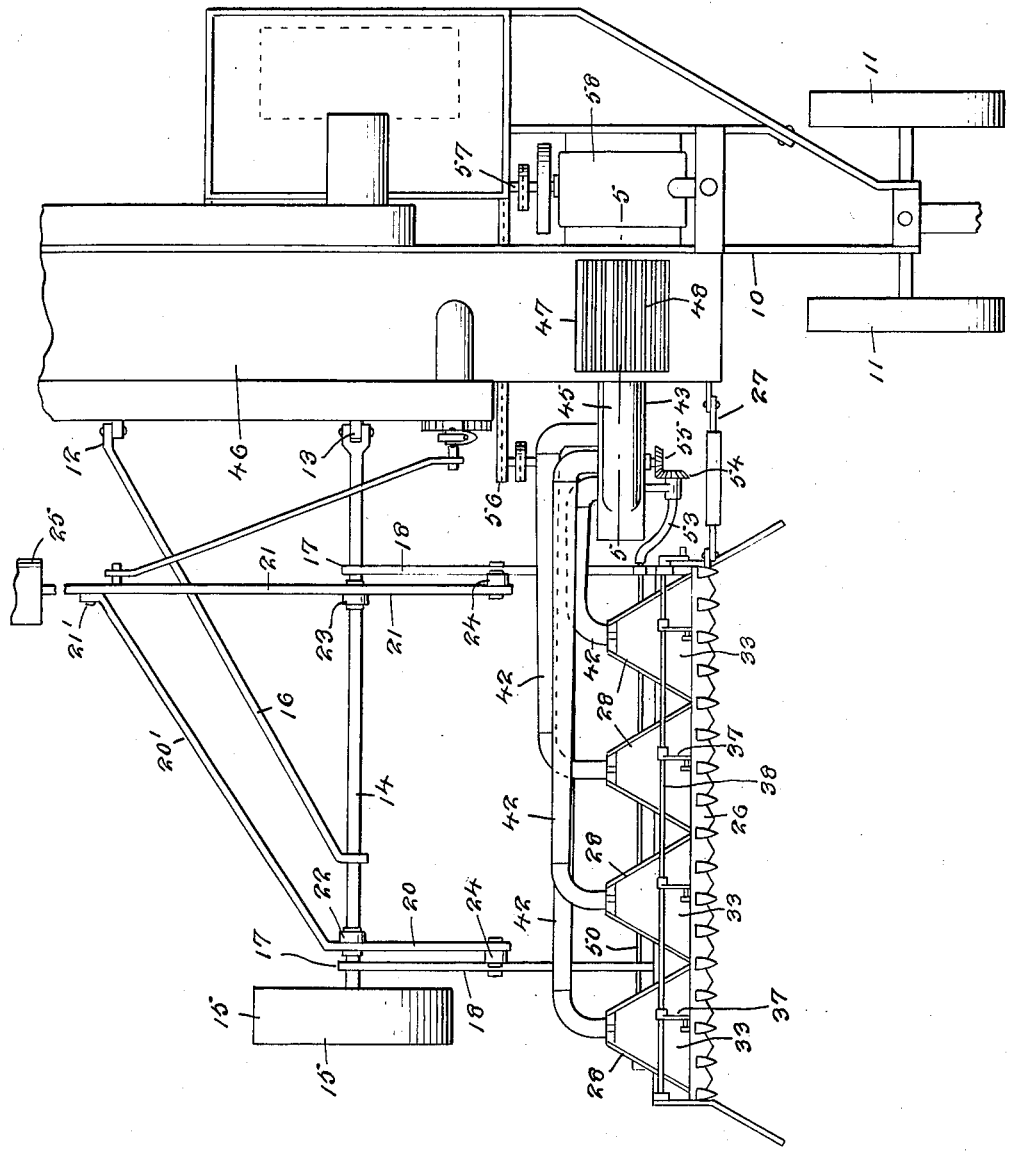

Referring now to the drawings the numeral 10 designates generally the wheeled frame or carriage of the machine, the forward portion of which is shown in Figure 1 and the front wheels of the carriage being indicated by the numeral 11. Hinged at one side of the machine, as at 12 and 13, is a foldable header carriage including the axle 14 having the ground wheel 15 at its outer end and being braced by diagonal stay 16. Hinged at their inner ends, as at 17, on the axle 14, is a pair of forwardly extending arms 18 on the outer ends of which the header frame 19 is mounted, said arms 18 with the header mechanism mounted thereon being counter-balanced by the frame including the two members 20, 21, where are respectively pivoted on the upper ends of uprights 22, 23, extending upwardly from the shaft 14 to which they are rigidly secured, the forward end portions of said members 20 and 21 having pivotal link connections 24 with said arms 18 and the frame member 20 having its rear portion 20' turned at an angle and attached to the rear portion of the member 21, as at 21', and a counter-balancing weight 25 being provided on the extreme end portion of said member 21.

Extending across the header frame member 19 is an ordinary reciprocatory cutter bar 26 which, together with the operating connections 27, are merely shown conventionally as well as the foregoing described frame structure on which the header is mounted.

Rearwardly of the cutter bar 26 is a plurality of suction nozzles 28 all of which are alike and the description of one will be accordingly made. As shown, the nozzle is flared to a considerable width at its forward open end and comprises a flat bottom wall 29 and opposite side walls 30, which latter not only converge rearwardly to the restricted throat portion 31, but their top edge portions 32 are also inclined downwardly toward said throat portion 31. The top of the nozzle comprises a plate 33 having tapered opposite side margins 34 corresponding to the angularity of the adjacent side walls 30 and being hingedly mounted at its narrow inner end portion 35. The cover plate 35 is supported at its forward end portion by a link 36 depending from a crank arm 37 on a transverse shaft 38, which latter carries a corresponding arm 37 and link member 36 for each of the other nozzles. The shaft 38 is provided with a lever 39 having a suitable latch 40 to engage a tooth sector 41 whereby the shaft may be rotated and releasably held in different positions to effect the vertical adjustment of the cover plate 33.

Each of the nozzle members 28 has a separate pipe connection 42 to the suction side of a blower 43, said blower, as shown more clearly in Figure 5, being of the circular body type with the usual fan-bladed rotor 44 therein and having a tangential outlet 45. As shown, the respective pipe connections 42 lead into the central portion of the cylindrical body 43, as at 42'.

In the combination machine as illustrated in the drawings, the tangential outlet 45 of the blower is connected to the conveyor housing 46 which latter, for the purposes of the present invention, has an air escape opening 47 in the top wall thereof adjacent the entrance 45' from the blower connection 45, and interposed between said outlet opening 47 and the inlet 45' from the blower connection is a series of arcuate bars 48 over-hanging the adjacent portion of the conveyor 49 which extends lengthwise in the lower portion of the housing 46 and receives the cut grain and other material mixed therewith from the respective nozzle elements 28, said bars 48 directing the material upon the conveyor and the air escaping between the bars and out through the opening 47.

Due to the suction created through the nozzles 28 by means of the pipe connections with the suction side of the blower 43, the grain stalks standing unbroken, or even those fallen are drawn against the cutter bar 26, and as the severed grain stalks and weeds which may be cut therewith are drawn into the nozzles 28 where the material is subjected to the action of an internal cutting mechanism which will now be described.

Extending transversely through the nozzles 28 is a shaft 50 having a series of rotary cutters 51 mounted thereon within the nozzles, said cutters being of any suitable type, but, preferably, comprising sharp edged blades and rotating between spring elements 52 which check the passage of the cut material and yieldably support it for the action of said cutters 51 whereby the grain stalks and weeds are cut into relatively small bits before being taken into the restricted throat 31 and passed through the pipe 42 into the blower 43. In this connection, it is preferable to gradually enlarge the pipes 42 from the restricted throats 31 towards the blower 43 so as to prevent choking and clogging of the passage-ways, and, obviously, the outlet 45 from the blower is also relatively proportioned to permit free passage of the material into the conveyor housing 46.

The shaft 50 may be driven by any suitable means, but, as conventionally shown in Figure 1, said shaft 50 is connected by a flexible shaft 53 to a beveled gear 54, which latter is driven by a similar gear 55 which may be mounted on the same shaft with the rotor 44 of the blower 43 or an obviously arranged counter-shaft which is in turn driven by a belt or chain 56 from a power shaft 57 directly or otherwise connected to the shaft of a motor 58, the details of which are not shown.

In the operation of the machine the counterbalanced header frame on which the respective nozzle members 28 are mounted is raised and lowered in the usual manner and also the cover plates 33 are adjusted vertically to vary the inlet opening of the nozzles according to the height of the grain to be cut. So, too, the raising and lowering of the cover plate 33 varies the degree and effective force of the suction. By the foregoing it is apparent that the grain is drawn by the suction from the nozzles 28 into close relation to the cutter bar 26 without shattering the stalks or kernels of grain and at the same time gathers the grain in relation to the cutter bar whether the stalks are standing erect or have been appreciably beaten down or fallen, with the result that the loss of grain is materially minimized and the harvesting accomplished in a highly efficient manner whether the field is in a weedy condition or not and the cut material is delivered to the threshing mechanism in the condition which permits of ready separation and recovery of the grain from the waste material.

Obviously, the structure admits of considerable modification within the spirit of the invention as defined by the appended claims, the invention, therefore, is not limited to the specific construction and arrangements shown.

What is claimed is:

1. In a combined harvesting and threshing machine, a header including a cutter bar, a flared suction nozzle located rearwardly of the cutter bar whereby to draw the grain across the cutter bar to be thereby cut, a blower, a pipe connecting the suction side of the blower and said nozzle, and means in the nozzle for re-cutting the material received therein.

2. In a combined harvesting and threshing machine, a header support, a cutter bar on said support, a plurality of flared suction nozzles mounted in parallel relation to each other on said support rearwardly of said cutter bar, a series of cutter elements disposed transversely in each of said nozzles, a blower, and separate pipe connections between said nozzles and the suction side of said blower.

3. In a combined harvesting and threshing machine, a header including a cutter bar and a suction nozzle rearward of said cutter bar, said suction nozzle being flared horizontally and having a hinged top, and means for adjusting said top angularly with respect to its hinge whereby to variably flare said nozzle vertically.

4. In a combined harvesting and threshing machine, a header including a cutter bar and a suction nozzle rearward of said cutter bar, said suction nozzle being flared horizontally and having a hinged top, means for adjusting said top angularly with respect to its hinge whereby to variably flare said nozzle vertically, and cutting elements disposed transversely within said nozzle.

5. In a combined harvesting and threshing machine, a header including a cutter bar, pneumatic means for drawing the standing grain into engagement with the cutter bar, said means including a horizontally flared suction nozzle rearward of the cutter bar, said nozzle having a hinged top for variably flaring the nozzle vertically, a blower, a pipe connection between the restricted throat of the nozzle and the intake of the blower, and cutting means within the nozzle, said means comprising longitudinally extending spaced parallel spring elements, and rotary cutting elements operating in cooperative relation to said spring elements.

6. The herein described suction header nozzle, comprising a flared body including a flat bottom and opposite convergent side walls merging with a restricted throat, and a cover plate hingedly mounted at its inner end adjacent the throat of the nozzle, said cover plate tapering marginally to coincide with the angularity of the side walls of the nozzle, and means for supporting said cover plate in different elevated positions whereby to variably flare the nozzle vertically.

7. The herein described suction header nozzle, comprising a flared body including a flat bottom and opposite convergent side walls merging with a restricted throat, and a cover plate hingedly mounted at its inner end adjacent the throat of the nozzle, said cover plate tapering marginally to coincide with the angularity of the side walls of the nozzle, means for supporting said cover plate in different elevated positions whereby to variably flare the nozzle vertically, and cutting means within the nozzle including longitudinally extending spring tongues and a series of rotary cutters in cooperative relation to said spring tongues.

WILLIAM O'BERG LA FAVE.